US008965542B2

(12) United States Patent
Frater et al.

(10) Patent No.: US 8,965,542 B2
(45) Date of Patent: Feb. 24, 2015

(54) DIGITAL PLAYBACK DEVICE AND METHOD AND APPARATUS FOR SPECTRALLY MODIFYING A DIGITAL AUDIO SIGNAL

(75) Inventors: Robert Henry Frater, Lindfield (AU); Lachlan Stewart James, Turramurra (AU); Linda Elizabeth Laidlaw, Marsfield (AU); Paul Benjamin Davis, Fremantle (AU); Peter John Hanley, Naremburn (AU); Benjamin McSweeney, Cheltenham (AU)

(73) Assignee: Neuromonics Pty Limited, Chatswood, New South Wales (AU)

( * ) Notice: Subject to any disclaimer, the term of this patent is extended or adjusted under 35 U.S.C. 154(b) by 1348 days.

(21) Appl. No.: 11/921,500

(22) PCT Filed: Jun. 7, 2006

(86) PCT No.: PCT/AU2006/000777

§ 371 (c)(1), (2), (4) Date: Jun. 1, 2009

(87) PCT Pub. No.: WO2006/130909

PCT Pub. Date: Dec. 14, 2006

(65) Prior Publication Data

US 2009/0307590 A1 Dec. 10, 2009

Related U.S. Application Data

(60) Provisional application No. 60/689,088, filed on Jun. 10, 2005.

(51) Int. Cl.
*G06F 17/00* (2006.01)
(Continued)

(52) U.S. Cl.
CPC ............ *H04R 25/70* (2013.01); *G10L 21/0205* (2013.01); *H04R 25/305* (2013.01);

(58) Field of Classification Search
CPC ........ A61B 5/121; A61B 5/128; H04R 25/75; H04R 25/70
USPC .................... 700/94; 600/25, 28, 55, 59, 559; 381/23.1, 58, 312, 313, 314, 320
See application file for complete search history.

(56) References Cited

U.S. PATENT DOCUMENTS 6,155,971 A * 12/2000 Calhoun et al. ................. 600/28
6,332,175 B1 * 12/2001 Birrell et al. .................. 711/112

(Continued)

FOREIGN PATENT DOCUMENTS

WO WO 00/56120 9/2000
WO WO 2005/053533 6/2005

OTHER PUBLICATIONS

International Search Report for PCT Application No. PCT/AU2006/000777 mailed Aug. 4, 2007.

*Primary Examiner* — Andrew C Flanders
(74) *Attorney, Agent, or Firm* — Sheridan Law, LLC

(57) ABSTRACT

A digital playback device and a method and apparatus for modifying a digital audio signal. The method includes allowing a user to select a digital audio track and modifying the digital audio track with a predetermined spectral modification signal to create a spectrally modified digital audio track. The spectrally modified digital audio track can then be retrieved by a user to a digital playback device.

24 Claims, 2 Drawing Sheets

(51) Int. Cl.
*H04R 25/00* (2006.01)
*G10L 21/02* (2013.01)
*G10L 21/06* (2013.01)

(52) U.S. Cl.
CPC .......... *H04R 25/75* (2013.01); *G10L 2021/065* (2013.01)
USPC .......................................................... 700/94

(56) References Cited

U.S. PATENT DOCUMENTS

| | | | | |
|---|---|---|---|---|
| 6,682,472 | B1 * | 1/2004 | Davis | 600/25 |
| 7,736,297 | B2 * | 6/2010 | Davis | 600/25 |
| 7,884,274 | B1 * | 2/2011 | Wieder | 84/609 |
| 2003/0165247 | A1 * | 9/2003 | Bantz et al. | 381/312 |
| 2006/0020161 | A1 | 1/2006 | Mageras et al. | |

* cited by examiner

DIGITAL PLAYBACK DEVICE AND METHOD AND APPARATUS FOR SPECTRALLY MODIFYING A DIGITAL AUDIO SIGNAL

CROSS REFERENCE TO RELATED APPLICATION

This application is the National Phase application of International Application No. PCT/AU2006/000777, filed Jun. 7, 2006, which designates the United States and was published in English and which claims benefit of the U.S. Provisional Application No. 60/689,088 filed Jun. 10, 2005. Each of these applications, in their entirety, are incorporated herein by reference.

BACKGROUND OF THE INVENTION

1. Field of the Invention

The present invention relates generally to a digital playback device and a method and apparatus for modifying a digital audio signal. More specifically, the present invention relates a digital playback device and a method and apparatus for modifying a digital audio signal to enhance the listening experience of a user.

2. Description of Related Art

A large percentage of the population experiences some form of an auditory system disorder. For many people, the disorder can be extremely disturbing and can, in some instances, lead to additional disorders. One example of an often disturbing type of auditory system disorder is hyperacusis. Hyperacusis is an intolerance for external noises, even at lower levels. Another auditory system disorder, which is related to hyperacusis, is tinnitus. People with tinnitus perceive sounds that are not present in the external environment and/or that other people cannot generally hear. These sounds can include ringing in the ears, buzzing and humming background sounds, roaring or whistling noises in the ears.

Tinnitus can have a negative impact on work, family and social life and can lead to an inability to relax and disturbance of concentration and sleep patterns. Tinnitus can be caused by hearing loss resulting from exposure to loud noises, certain types of drug & medication, or middle ear infections. In some instances, tinnitus arises from a condition that requires medical or surgical intervention.

A large proportion of the population (around 15%), experience some degree of tinnitus and some reaction involving multiple areas of the brain. For a small proportion, around 1-2% of the general population, a secondary reaction which consists of a negative, self-reinforcing cycle is present involving the auditory cortex, the brain stem, the limbic and autonomic systems, leads to significant distress and disturbance. This reaction appears to involve neural rewiring as recently demonstrated with MRI and PET brain scanning.

Another common auditory disorder is hearing loss. Sufferers of this condition often find that their listening experience in many situations is significantly impaired, for example when listening to music.

Accordingly, a solution is needed to assist these individuals manage the effects of these auditory system disorders.

BRIEF SUMMARY OF THE INVENTION

An object of the present invention is to provide a more effective way of assisting individuals manage the effects of auditory system disorders.

Another object of the present invention is to provide a digital playback device that includes a processor for receiving the audio signal, spectrally modifying the audio signal to compensate for an auditory system disorder, and outputting a spectrally modified audio signal to a user.

Yet another object of the present invention is to provide a digital playback device that includes a processor for receiving the audio signal, spectrally modifying the audio signal to compensate for an auditory system disorder, and a monitor for monitoring the volume setting of the digital playback device when the digital playback device is in use and/or a monitor for monitoring the audio signals being selected by a user when the digital playback device is in use.

Yet another object of the present invention is to provide a digital playback device that includes a processor for receiving the audio signal, determining whether the audio signal is an approved audio signal, spectrally modifying the audio signal to compensate for hearing loss, and outputting a spectrally modified audio signal. According to this object, the processor performs less spectral modification if the audio signal is not an approved audio signal than if the processor determines that the audio signal is an approved audio signal.

Yet another object of the present invention is to provide a method for distributing a digital audio track that includes modifying the digital audio track with one of a predetermined number of spectral modification signals to create a spectrally modified digital audio track and providing the spectrally modified digital audio track to the user.

Yet another object of the present invention is to provide a method for distributing a digital audio track that includes obtaining user information to determine which of a predetermined number of spectral modification signals to use to create the spectrally modified digital audio track.

Yet another object of the present invention is to provide a method for distributing a digital audio track that includes allowing a user to provide a spectral modification signal to modify the digital audio track. According to this object, the user may receive the spectral modification signal from a clinic.

Yet another object of the present invention is to provide a system for distributing a digital audio track that includes a provider-physician interface for allowing a physician to provide a user specific spectral modification signal to the provider.

BRIEF DESCRIPTION OF THE DRAWINGS

Additional objects, features, and advantages of the present invention will become apparent from the following detailed description of embodiments of the invention in conjunction with the accompanying drawings where like reference numerals indicate like features, in which.

DETAILED DESCRIPTION OF EMBODIMENTS

Recent research related to auditory system disorders has identified solutions to assist these individuals.

Figure 3:
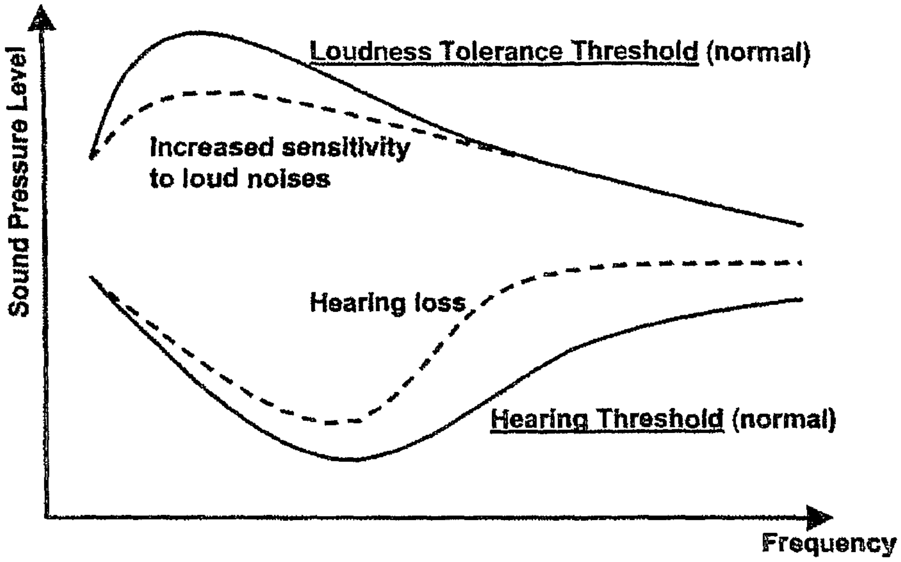
FIG. 3 is a diagram illustrating the contour changes associated with auditory system disorders in accordance with the present invention.

One solution, based on over a decade of research into the effect of various acoustic stimuli on auditory system disorders, an understanding of the brain signaling which contributes to auditory system disorders (including but not limited to, for example, tinnitus, hyperacusis, and hearing loss) and recognition that the auditory system disorder may be different for everyone, is providing stimulation to auditory pathways starved by hearing loss. For example, as illustrated in FIG. 3, an individual suffering from hearing loss may have an above normal hearing threshold. In addition, the individual may also have an increased sensitivity to loud noises (e.g. hyperacusis, etc) which results in a lower than normal threshold for louder signals at certain frequencies. The upper threshold (the loudness tolerance threshold), as seen in FIG. 3, may be most prominent at frequencies that are different than the frequencies where hearing loss occurs.

The solution includes a complete audiological and tinnitus assessment, a customized acoustic stimulus delivered via the system, and a program of education and support from an audiologist or specialist clinician. The system has been designed to break a negative cycle of disturbance by providing stimulation to auditory pathways starved by hearing loss and engaging positively with the limbic system (an emotional response system), and allowing for intermittent exposure to the auditory system disorder within a pleasant stimulus, thereby reducing awareness of the auditory system disorder and the disturbance associated with the auditory system disorder.

Generally, the solution may consist of 2 stages: a Pre-Conditioning Stage and an Active Stage. In both stages, the acoustic signal is provided with pleasing and relaxing sounds making the treatment easy and pleasant to use. The Pre-Conditioning Stage typically provides an acoustic signal with a high level of interaction with the auditory system disorder to provide relief while using the solution. The Active Stage provides an acoustic signal with a lower level of interaction with the auditory system disorder. In clinical trials, the "intermittent" exposure of the effects of the auditory system disorder during the Active Stage creates a desensitization process, and has proven to be efficient and effective at reducing awareness of the auditory system disorder and the associated disturbance.

The effects of the auditory system disorder are usually associated with some hearing loss, typically in the high frequencies, i.e., above the normal speech range. However, each individual's hearing and auditory system profile is unique. In fact, this profile is commonly different for each ear. Accordingly, a detailed assessment of each individual's hearing and auditory system profile is performed for each ear, and the acoustic stimulus is customized for this profile. The customization ensures that each individual receives the signals required to desensitize the individual to their auditory system disorder at a comfortable and pleasant listening level. Additionally, the customization or modification generally compensates for the hearing threshold as well as the loudness tolerance threshold.

Individually customized spectral modification also allows even stimulation to be provided across the full range of auditory pathways, including those previously starved of input. As a result, the acoustic stimulus used in the system provides stimulation across a considerably wider range than other available acoustic therapies, generally including at least up to 12.5 kHz. (hearing aids only amplify the speech range, up to approximately 5 kHz). Generally, the acoustic signals are distinct and correlated for the left and right ears, and are provided in stereo, which further ensures stimulation of the multiple pathways of the auditory system.

Conventionally, the acoustic signals are provided to users in a clinical setting so the individuals use and progress could be monitored. Alternatively, the acoustic signals may be recorded in a clinical setting in accordance with a patients customized spectral modification so the individual can use the acoustic signal away from the clinical setting.

However, the clinical environment may not always be the most optimal setting for every individual. Often, an individual may not be so effected by the auditory system disorder so as to require monitored stimulation. In fact, in some instances spectral modification can enhance the listening experience of individuals that do not have an auditory system disorder. In these embodiments, and even for individuals that have an auditory system disorder, it may not be cost effective to undergo complete clinical monitoring for an extended period of time.

In embodiments, the acoustic signal may be a music signal. Music signals generally cover a wide spectrum of frequencies and are generally enjoyable to listen to. However, as described above, the signal is typically spectrally modified in a clinical setting. If the clinic was to use music signals, the clinic may be able to record several hours of spectrally modified signals but it is likely that what ever the amount was, the listening experience by the individual would begin to be repetitive. For several reasons, it may not be possible for the clinic to create the necessary diversity that individuals may be seeking.

Figure 1:
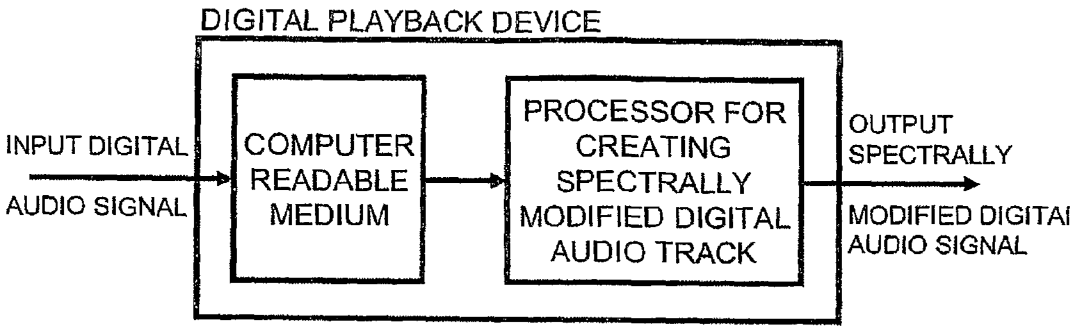
FIG. 1 is a functional schematic of a digital playback device in accordance with an embodiment of the present invention.

FIG. 1 is a functional schematic of a digital playback device in accordance with an embodiment of the present invention. As illustrated in FIG. 1, the digital playback device includes an input, a memory, a processor, and an output. The digital playback device may be a specialized device or more appropriately, the digital playback device may be a commercially available device such as an iPod (MP3 player), or some other device. Generally, commercially available devices may include players of any format. Some common formats, for example, include, but are not limited to, MP3, WMA, WAV, MP2, RA, MPEG, and many other equivalents. It should be readily understood by a person of ordinary skill in the art that the present invention should not be limited to any specific set for file formats. These commercially available devices have become common because of their versatility, ease of use and inexpensive nature. In this embodiment, the digital playback device includes an input for inputting an audio signal, a computer readable medium for storing the audio signal, a processor for receiving the audio signal and modifying the filtering coefficients (also referred to as a spectral modification signal and it should be readily understood that an actual signal such as an audio signal may be used or alternatively, an algorithm may be used to modify the digital audio signal and that regardless of whether the signal or the algorithm is used, the digital audio signal can be modified independently for the left and right channels) used in the digital playback device to produce a spectrally modified audio signal; and an output for outputting the spectrally modified audio signal. In this embodiment, the audio signal is stored in its original format and then modified by the processor before playback. In some embodiments, the modified signal may also be stored in the digital playback device. Additionally, the modification of the filtering coefficients can be performed in numerous ways to reduce the effects of an auditory system disorder or to make the digital audio signal more enjoyable for an individual without an auditory system disorder. Specifically, instructions to modify the signal can be programmed into the processor from the factory, it can be loaded into the processor by a user or a clinic as software or firmware, or it can be implemented in hardware. For example, if the program is loaded from the factory, there may be different types of devices available. In one embodiment, for example, there may be two "models" for a device, a first model for spectrally modifying the audio signal for an individual with hearing loss at higher frequencies and increased sensitivity of loud noises at lower frequencies (See FIG. 3) and a second model for modifying a signal for an individual with hearing loss at lower frequencies and sensitivity at higher frequencies. Of course, this is only an example and it should be readily understood that many different implementations could be effective. In some embodiments, the digital playback device may also have a decoder for decoding the digital audio signal. For example, may commercial device are able to play MP3, WMA, or equivalent files. In this case, the files are encoded in a specific manner and a special decoding device is generally utilized. If the decoding processor is provided, it is contemplated that the processor for spectrally modifying the digital audio signal may be incorporated in the decoding process or it may be provided separately. In situations where the processor is separate, the processor may be internal to the digital playback device or, in embodiments, may be coupled to the device externally. If the processor is coupled to the digital playback device externally, it may for example be coupled to the output of the digital playback device so that the processor can spectrally modify the digital audio signal before the spectrally modified digital audio signal is delivered to the user. In fact, an externally coupled device may allow the processor to be more readily programmed for the individual.

In some embodiments, the device may include a compliance monitor for allowing a user to monitor how much time the user has used the device since it is generally important to use the device for predetermined amounts of time to be most effective. As with many digital playback devices, a battery for supplying power to the device is generally provided with sufficient battery life to allow extended use of the digital playback device without recharging. In some embodiments, the battery life may be at least 4 hours or as much as one week of regular use.

Additionally, since the digital storage technology improves daily, in some embodiments, the computer readable medium for the digital playback device may be large enough to provide a diversity of audio signals. In other embodiments, the computer readable medium storage capacity may be approximately equivalent to approximately 4 hours of the treatment signal or approximately 250 megabytes of capacity. Of course other capacities may also be desirable, for example, some device may have 20 or 40 gigabytes of capacity and sometimes even more while other devices may have as little as 10 megabytes of capacity or even less. As would be readily understood by a person of ordinary skill in the art, the present invention should not be limited to any specific capacity or capacity range.

In addition to playback, the digital playback device may include other advanced features. For example, since it may be important in certain embodiments to restrict the spectrally modified music to the individual for which the digital audio signal was modified, the digital playback device may include a user identification code in order to allow correct identification of the individual's own digital playback device in the event that more than one digital playback device gets placed together. Alternatively, so that the device may be shared, an on/off type of a switch may be used so that the digital playback device can be used without spectral modification. In another embodiment, the device may include a more advanced switch capable of spectrally modifying a digital audio signal in several different ways to accommodate several different individuals that may be sharing a device.

The digital playback device may also include a data downloading function for downloading logged information from the user device. Some information that may be useful, based on experience, is the times the device was used, the volume level of the device, what audio signals the individual listened to, etc.

Of course, as would be readily understood by a person of ordinary skill in the art the above described embodiment may be implemented in several ways. For example, the input on the digital playback device or the data downloading function described above, may be performed by any of a wired interface, an infrared interface, or a wireless interface.

In another embodiment of the present invention, the digital playback device may include a microphone as its input or as an auxiliary input. In this embodiment, addition of a microphone may be especially useful in for example, a theater or similar setting. The signal input from the microphone may be stored on the computer readable medium or it may be processed and output to a user without storage. In either situation, the spectral modification in "real time" situations may add additional benefit to individuals with auditory system disorders that they may not otherwise have. Such a feature may be an addition to a conventional/commercial device such as an MP3 player or it may be part of a purpose built device.

As discussed previously, all of the additional elements of the previous embodiments, including but not limited to the battery, data downloading, computer readable medium, and decoder, may also be utilized in this embodiment.

In some embodiments, it may be important to distinguish between approved and non-approved signals. Specifically, depending on an individual's auditory system disorder, certain digital audio signals may not be amenable to spectral modification or may not be amenable to spectral modification beyond a certain extent. In these situations, the processor may be configured to distinguish between the two signals and therefore spectrally modify the signals to different extents. In some embodiments, the processor may not even spectrally modify a non-approved signal. For the processor to make such a determination, the processor may be configured to read the entire signal or may read a particular code recorded on the signal at some time prior to being used by the individual.

As discussed previously, all of the additional elements of the previous embodiments, including but not limited to the battery, data downloading, computer readable medium, and decoder, may also be utilized in this embodiment.

Figure 2:
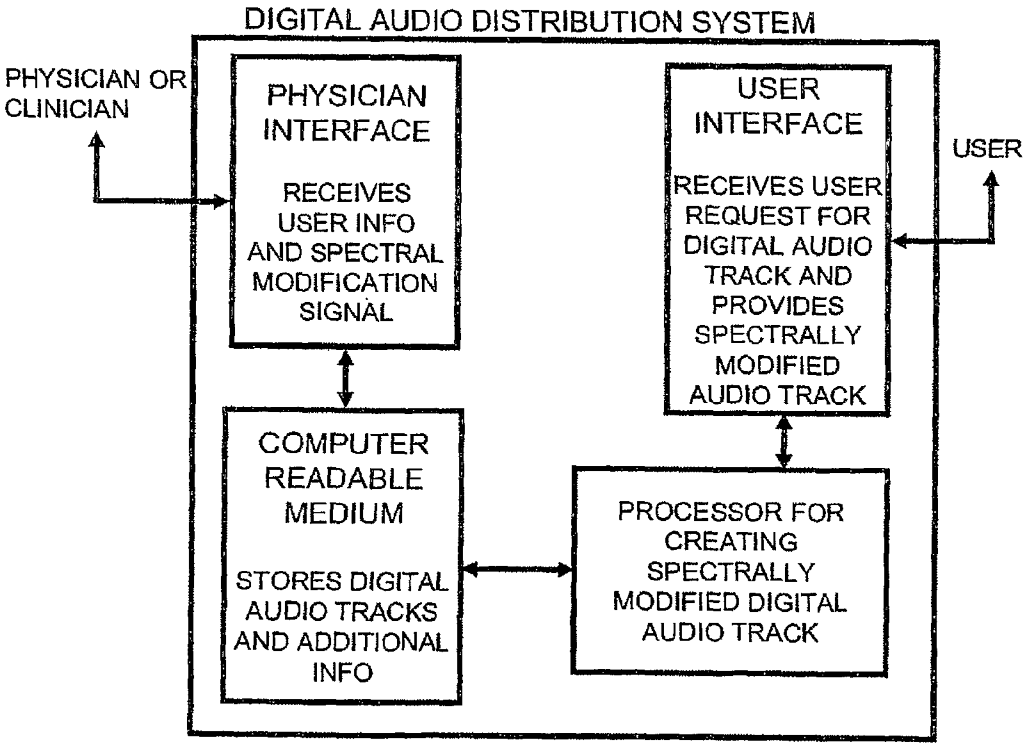
FIG. 2 is a functional schematic of a digital audio distribution system in accordance with an embodiment of the present invention.

FIG. 2 is a functional schematic of a digital audio distribution system in accordance with an embodiment of the present invention. This embodiment focuses on the method for delivering digital audio signals to an individual or an individual's digital playback device. As should be readily understood by a person of ordinary skill in the art, the digital playback device discussed with reference to these embodiment may be the same as the digital playback devices discussed above or may be commercial off the shelf playback devices.

Generally, the system in accordance with an embodiment of the present invention utilizes a collection of digital audio tracks. One popular example of such a database is www.iTunes.com. This internet interface allows individuals to purchase digital audio tracks individually and download them directly (or indirectly) to their digital playback device. Because this collection and others as well are stationary, it is possible for these databases to contain millions of audio tracks for an individual to select from.

In the present invention, a similar collection may be utilized or a new collection can be established. In either case, the individual would be able to access the system, and select at least one audio track. After selecting the audio track, the system modifies the digital audio track to create a spectrally modified digital audio track. The spectrally modified digital audio track is then provided to the user. In this manner, it is not necessary for the digital playback device to include a processor for modifying the digital audio signal since it is modified before it is downloaded by the individual. Additionally, although the embodiment describes that the digital audio track is spectrally modified after it is selected, the present invention also contemplates a collection of spectrally modified digital audio tracks even though such a collection may be less practical given the versatility and storage space that would be required to store all of the spectrally modified digital audio tracks.

In embodiments, the individual may interact with the system over the internet or in some other acceptable means such as by visiting a store front or ordering over the phone.

There are several ways that the system can determine how or with which spectral modification signal to modify the digital audio signal. In one embodiment, the system may request user information to determine which of the predetermined number of spectral modification signals to use to create the spectrally modified digital audio signal. Specifically, the system may have a number generic spectral modification signals and may pick one depending on certain criteria and information obtained from the individual.

In another embodiment, the system may allow the user to provide to the system a spectral modification signal to modify the at least one digital audio track. In this embodiment, the individual may obtain the spectral modification signal from a clinic or similar entity.

In another embodiment, the user may select one of a predetermined number of spectral modification signals to modify the digital audio track and In some instances, the individual may obtain information from a clinic or similar entity to determine which spectral modification signal to chose or the clinic or similar entity may indicate to the individual which signal to select. In a related embodiment, the clinic or similar entity may prescribe a certain spectral modification to an individual much like a drug prescription. Once the individual has the prescription, they will be able to provide the necessary information to the system such that the correct spectral modification signal is selected.

In yet another embodiment, the system may be able to gather enough information from an individual to create a customized or partially customized spectral modification signal. In this situation, the system may request information from the individual and may also administer certain tests to the individual such as an auditory test or the like and process the necessary data from the tests. In this manner, the individual may, in some embodiments, be able to obtain a customized spectral modification signal without visiting a specialized clinic.

Another embodiment of the system in accordance with an embodiment of the present invention is shown in FIG. 2. In this embodiment, a physician interface is added so that the physician/clinician can directly interact with the system as well; in these embodiments, the physician/clinician would be able to provide spectral modifications to the system since the physician/clinician may be in the best position to determine how to produce generic signals. Alternatively, the physician could simply load the individual's specific spectral modification signal to the system and designate it as such. The user could then access the system and retrieve spectrally modified digital audio tracks based on their customized spectral modification signal. Additionally, by involving the physician/clinician, the system may also provide samples that could be provided to the individual.

Many alterations and modifications of the present invention will be comprehended by a person skilled in the art after having read the foregoing description. It is to be understood that the particular embodiments shown and described by way of illustration are in no way intended to be considered limiting. Therefore, references to details of particular embodiments are not intended to limit the scope of the claims, which in themselves recite only those features regarded as essential to the invention.

The embodiments described herein are intended to be illustrative of this invention. As will be recognized by those of ordinary skill in the art, various modifications and changes can be made to these embodiments and such variations and modifications would remain within the spirit and scope of the invention defined in the appended claims and their equivalents. Additional advantages and modifications will readily occur to those of ordinary skill in the art. Therefore, the invention in its broader aspects is not limited to the specific details and representative embodiments shown and described herein.

What is claimed is:

1. A digital playback device comprising:

an input for inputting an audio signal;

a computer readable medium for storing the audio signal;

a processor configured to:

receive the audio signal;

determine whether the audio signal is one of (1) an approved signal that is amenable to a desired spectral modification configured to compensate for an auditory system disorder, or (2) a non-approved signal that is not amenable to spectral modification to compensate for the auditory system disorder; and modify filtering coefficients used in the digital playback device to produce a spectrally modified audio signal configured to compensate for the auditory system disorder when the audio signal is determined to be amenable to the desired spectral modification; and an output for outputting the spectrally modified audio signal.

2. The digital playback device of claim 1, wherein the digital playback device is configured to decode an MP3, WMA, or equivalent audio signal.

3. The digital playback device of claim 2, wherein the processor for receiving the audio signal also decodes the MP3, WMA, or equivalent audio signal.

4. The digital playback device of claim 1, further comprising a decoding processor for decoding the audio signal.

5. The digital playback device of claim 4, wherein the processor and the decoding processor are integral to the digital playback device.

6. The digital playback device of claim 1, wherein the processor is constructed and arranged to be externally coupled to the digital playback device.

7. The digital playback device of claim 6, wherein the processor is directly coupled to the output of the digital playback device.

8. The digital playback device of claim 1, wherein the auditory system disorder is tinnitus.

9. The digital playback device of claim 1, wherein the auditory system disorder includes conditions of sound loudness discomfort, including hyperacusis.

10. The digital playback device of claim 1, further comprising:

a compliance monitor for allowing a user to monitor how much time the user has used the device.

11. The digital playback device of claim 1, further comprising:

a battery for supplying power to the device with sufficient batter life to allow extended use without recharged.

12. The digital playback device of claim 11, wherein the battery has a life approximately equivalent to at least one week of treatment.

13. The digital playback device of claim 1, wherein the computer readable medium has a storage capacity sufficient to provide a choice, range, or diversity of audio signals.

14. The digital playback device of claim 13, wherein the computer readable medium storage capacity is approximately equivalent to on of approximately 4 hours of the treatment signal, approximately 250 megabytes of capacity or approximately 20 gigabytes of capacity.

15. The digital playback device of claim 1, further comprising a user identification code in order to allow correct identification of the user's own digital playback device in the event that more than one digital playback device gets placed together.

16. The digital playback device of claim 1, further comprising a data downloading function for downloading logged information, wherein the logged information contains information relating to the user's use of the digital playback device.

17. The digital playback device of claim 16, wherein the data downloading function and the inputting function is performed by at least one of a wired interface, an infrared interface, or a wireless interface.

18. A method for distributing a digital audio track; the method comprising:

allowing a user to select at least one digital audio track;

determining whether the digital audio track is one of (1) an approved digital audio track that is amenable to a desired spectral modification configured to compensate for an auditory system disorder, or (2) a non-approved digital audio track that is not amenable to spectral modification to compensate for the auditory system disorder; and modifying the at least one digital audio track with one of a predetermined number of spectral modification signals to create at least one spectrally modified digital audio track configured to compensate for the auditory system disorder when the audio signal is determined to be an approved digital audio track that is amenable to the desired spectral modification; and providing the at least one spectrally modified digital audio track to the user.

19. The method of claim 18, wherein the at least one spectrally modified digital audio track is provided to the user over a network so that the at least one spectrally modified digital audio track can be downloaded onto a digital playback device.

20. The method of claim 18, wherein the step of modifying the at least one digital audio track further comprising:

obtaining user information to determine which of the predetermined number of spectral modification signals to use to create the at least one spectrally modified digital audio track.

21. A system for distributing a digital audio track, the system comprising:

a provider for storing at least one digital audio track;

a provider-physician interface for allowing a physician to provide a user specific spectral modification signal to the provider;

a provider-user interface for allowing a user to select at least one of the at least one digital audio tracks;

a digital processor configured to:

receive the at least one of the digital audio tracks;

determine whether the at least one of the digital audio tracks is one of (1) an approved signal that is amenable to a desired spectral modification configured to compensate for an auditory system disorder, or (2) a non-approved signal that is not amenable to spectral modification to compensate for the auditory system disorder; and modify filtering coefficients used in the digital playback device to produce a spectrally modified digital audio track configured to compensate for the auditory system disorder when the audio signal is determined to be amenable to the desired spectral modification;

wherein the at least one spectrally modified digital audio track is retrievable by the user from the provider.

22. The system of claim 21, wherein the provider identifies the user when the user inputs identification information.

23. The system of claim 22, wherein the identification information is a username and password.

24. The system of claim 21, wherein the provider-physician interface allows the physician to select at least one digital audio track from the provider to provider to the user during a consultation between the user and the physician.

* * * * *